June 10, 1969 A. T. SHEPHERD ET AL 3,449,743
APPARATUS FOR DETERMINING THE EXTENT AND SENSE
OF THE MOVEMENT OF A CYCLIC PATTERN
Filed July 6, 1965 Sheet 1 of 2
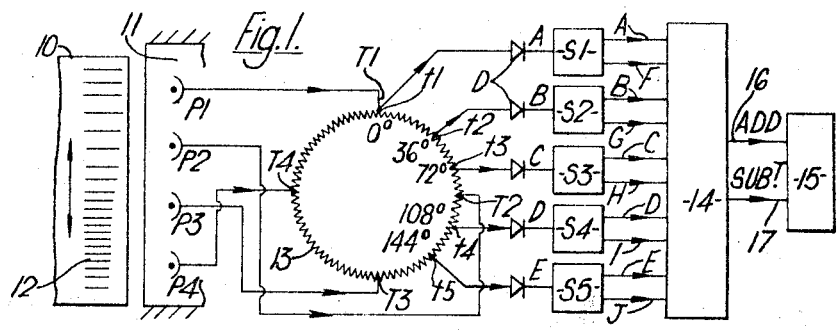
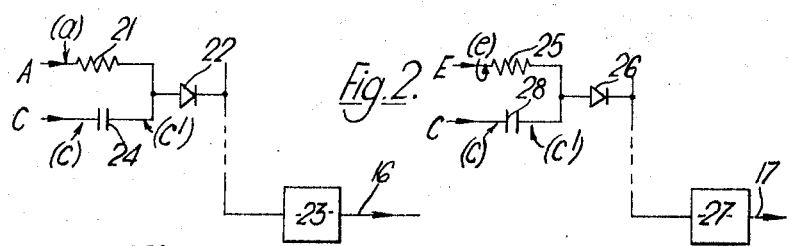
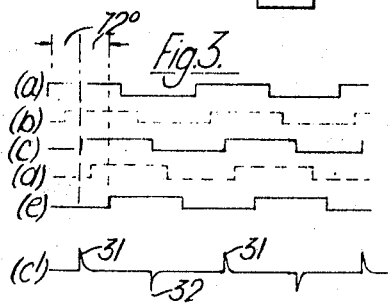
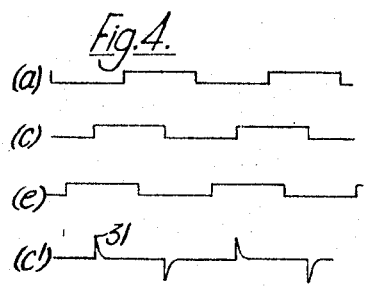
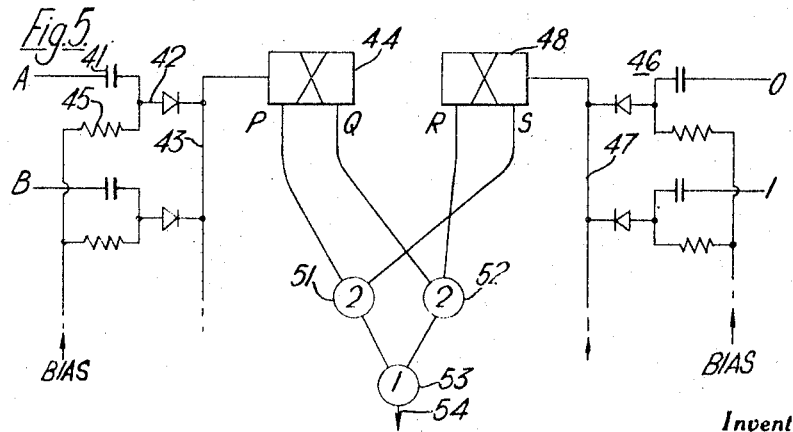
Inventors
A. T. SHEPHERD
R. R. McLAREN
By
Cameron, Kerkam & Sutton
Attorneys

United States Patent Office 3,449,743
Patented June 10, 1969

3,449,743
APPARATUS FOR DETERMINING THE EXTENT AND SENSE OF THE MOVEMENT OF A CYCLIC PATTERN
Alexander Turnbull Shepherd and Ronald Robert McLaren, Edinburgh, Scotland, assignors to Ferranti, Limited, Hollinwood, Lancashire, England, a company of the United Kingdom of Great Britain and Northern Ireland
Filed July 6, 1965, Ser. No. 469,449
Claims priority, application Great Britain, July 7, 1964, 27,883/64
Int. Cl. H04l 3/00; G06f 7/38; G06g 7/00
U.S. Cl. 340—347            9 Claims

ABSTRACT OF THE DISCLOSURE

Photoelectric apparatus for representing by a pulse count the movement of a cyclic optical pattern past a bank of photocells the outputs from which derive the pulses for the counter by way of a phase-multiplying resistor chain to increase the number of pulses generated per cycle of the movement.

---

This invention relates to apparatus for determining the extent and sense of the movement of a cyclic pattern with respect to a reference structure, in particular where the pattern is itself arranged to move in dependence on the movement of a part of a machine tool with respect to the framework of the tool, so that by measuring the movement of the pattern that of the tool part may be derived.

An object of the invention is to provide apparatus for the purpose stated which derives the measurement in the form of a pulse count to an especial degree of resolution.

In accordance with the present invention, apparatus for determining the extent and sense of the movement of a cyclic pattern with respect to a reference structure includes $n$ pickup devices, where $n$ is at least 3, secured to said structure so as to respond electrically in dependence on the conditions of the pattern at $n$ regularly spaced angular positions along the pattern, thereby providing a symmetrical $n$-phase electrical signal when the pattern moves, a tapped resistance chain, connections for applying the $n$ phases of the signal effectively in cyclic order to taps on the chain at equally-spaced resistive points thereon, phase-conversion arrangements connected to the chain to provide in response to the $n$-phase energisation of the chain symmetrical N-phase signal, where N is at least twice $n$, signal-squaring stages connected to the phase-conversion arrangements for converting into square-wave form the signal in each phase, and utilisation means connected to the squaring stages and including a bi-directional counter for deriving the measurement of the movement in terms of a pulse count.

In the accompanying drawings,

FIGURE 1 is a schematic diagram of one embodiment of the invention,

FIGURE 2 shows a detail of a part shown generally in FIGURE 1,

Figure 6:
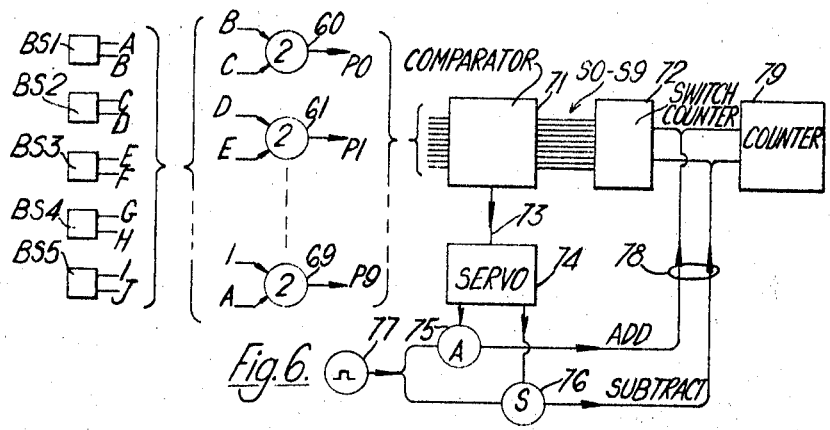
Figure 7A:
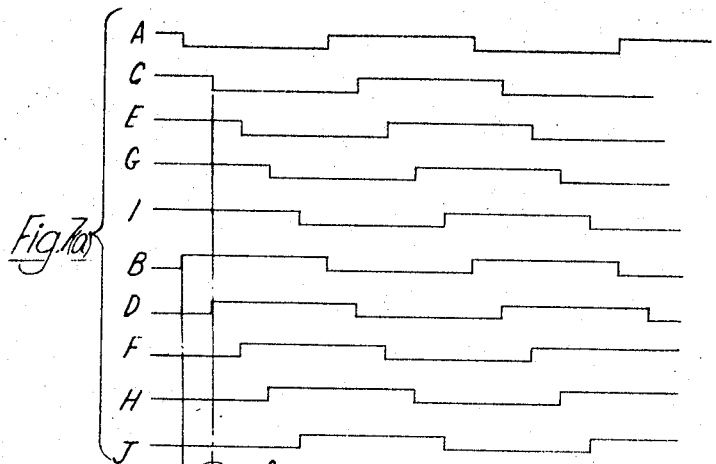
Figure 7B:
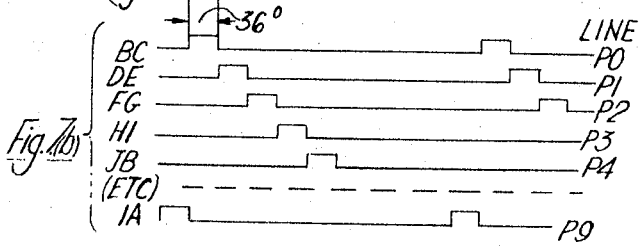
Figure 7C:
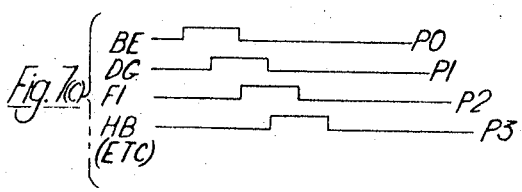
Figure 8:
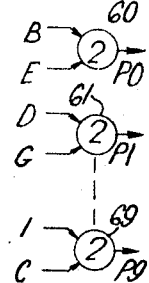

FIGURES 3 and 4 are waveform diagrams to illustrate the operation of the apparatus of FIGURE 2, FIGURES 5, 6, and 8 are schematic diagrams of three other embodiments, FIGURES 7(a), 7(b) and 7(c) have waveform diagrams to illustrate the operation of the apparatus of FIGURES 6 and 8.

In carrying out the invention in accordance with one form by way of example, see FIGURE 1, apparatus for determining the extent and sense of the movement of a worktable 10 of a machine tool with respect to the tool framework 11 includes a cyclic pattern 12 of optical form (which may conveniently be set up by two optical gratings) arranged to move in dependence on the table movement. Four photocells P1 to P4 are fixed to the frame so as to respond to conditions of the pattern at positions spaced apart by 90 degrees of the pattern cycle. The voltage outputs from the cells are applied in cyclic order by way of low-impedance amplifiers (not shown) to four input taps T1 to T4 on a circular resistance chain 13. These taps are equally spaced resistively so that when the worktable causes the pattern to move, the chain is energised in quadrature by a symmetrical four-phase voltage.

Phase-conversion arrangements include five output taps $t1$ to $t5$ at spaced positions around the chain, tap $t1$ coinciding with input tap T1. The resistance values between taps are such that the phases of the potentials at taps $t1$ to $t5$, starting with tap $t1$ at phase 0° and proceeding clockwise as seen in the drawing, are 36°, 72°, 108° and 144°. There are no output taps in the remaining portion of the chain. As will be explained in more detail later, the values of the resistances between successive output taps follow a tangent law with respect to the resulting phases.

The phase-conversion arrangements are connected to signal-squaring stages in the form of five phase-splitting stages S1 to S5 to which the output taps are respectively connected by way of diodes D. Each stage has the usual two output terminals which provide a signal in phase with the input and a signal in counterphase with it, both these signals being in squarewave form. Stages S1 thus produce between them a counterphase of each signal derived from the output taps $t1$ to $t5$, thereby providing a symmetrical ten-phase signal, or ten signals uniformly displaced in phase by 36°.

This ten-phase signal is applied to utilisation means comprising signal-conversion stages, indicated generally at 14, which are arranged to derive a pulse in respect of each cycle of the ten phases, together with a bidirectional counter 15 to which those pulses are applied over an Add channel 16 or over a Subtract channel 17 according to the direction of the pattern movement.

In operation, a movement of the worktable and pattern in what for convenience of reference may be described as a Forward direction causes the resistance chain 13 to be energised by the four-phase input voltage applied by the photocells to the input taps T1 to T4. From the chain, the phase-conversion arrangements constituted by the output taps $t1$ to $t5$ and phase-splitting stages S1 to S5 produce a symmetrical ten-phase output. In signal-conversion stages 14 a pulse is derived for each cycle of the ten phases and applied to the counter over the Add channel 16. Movement of the table and pattern in the Reverse direction so shifts the phases of the ten signals relatively to one another that in response the stages 14 direct the pulses into the Subtract channel 17. The counter operates in the usual manner by adding the pulses received over the Add channel and subtracting from the count the pulses received over the Subtract channel. Thus at any given moment the algebraic total of pulses as indicated by the counter gives a digital indication of the extent of the net movement of the table in the Forward direction from the starting point.

It will be appreciated that although only four photocells are used to obtain signals from the pattern, the number of pulses passed to the counter for each unidirectional cycle of the pattern movement is ten. The measurement of the movement is thus effected with accuracy to one tenth of the wavelength of the pattern and thus to an especial degree of resolution.

The positions of the output taps $t1$ to $t5$ to ensure the desired phase relationship may be determined by adjustment, using an oscilloscope to indicate the phase shifts. The positions may however be calculated in reliance on the fact that between adjacent input taps energised in quadrature, such as taps T1 and T2, the tangent of the phase angle at an intermediate tap is equal to the ratio of the resistance between it and those input taps respectively. For example, at output tap $t2$ the potential is required to be shifted in phase by 36° from the potential at $t1$; the tangent of this angle is 0.725, and this is the ratio required for the resistance between taps $t2$ and T1 and that between taps $t2$ and 2T. If 950 ohms is taken as a convenient overall resistance between taps T1 and T2, tap $t2$ is found to be 400 ohms from tap T1 and 550 ohms from tap T2.

Tap $t3$ is similarly found to be 730 ohms from tap T1 (and hence 330 ohms from $t2$) and 220 ohms from T2. Taps $t4$ and $t5$ on the other side of tap T2 are the same resistance distances from it as are taps $t3$ and $t2$ respectively.

The signal-conversion stages 14 may be as shown in part in FIG. 2. For convenience of reference the ten signals will be designated A to J, the five signals A to E being those from taps $t1$ to $t5$, and the remaining five F to J being the corresponding counterphase signals as derived by phase-splitting stages S1 to S5. FIG. 2 shows the stages for deriving the pulses from signal C.

In this arrangement, signal A is applied in its square-wave form (as supplied by phase-splitting stage S1) by way of a resistor 21 and gating means in the form of a diode 22 to a pulse-generator stage 23 the output of which is connected as the Add channel 16 to the counter. Signal C, also in square waveform, is connected to diode 22 and stage 23 by way of a capacitor 24.

Similarly signal E (in square form) is connected by way of a resistor 25 and a diode 26 to a pulse-generator stage 27, the output of which is applied to the counter over the Subtract channel 17, signal C being applied to the diode by way of a capacitor 28. Corresponding arrangements, to be briefly indicated later, are made for deriving the pulses from the nine other signals.

The operation of this equipment will be described with reference to FIG. 3, which shows the waveform conditions set up when the table is moving in the Forward direction, and FIG. 4 the same waveforms but as set up by a Reverse movement. For convenience of reference the more-positive half-cycles of the square waveforms will be described simply as the positive half cycles, and the others as the negative half-cycles.

In FIG. 3, the squared waveforms of the signals in phases A, C, and E, as received from the phase-splitting stages, are shown at $a$, $c$, and $e$. The intervening waveforms of phases B and D are shown in broken lines, as they are not concerned with the apparatus of FIG. 2. Wave $c$ is accordingly shown as lagging 72° on wave $a$, and wave $e$ as lagging another 72° on wave $c$. This particular group of signals is chosen because the signals in phases A and E are nearly in counterphase with one another and that in phase C is nearly in quadrature with each of them. This last relationship ensures that the edges of wave $c$ fall clearly within the contemporaneous half-cycles of waves $a$ and $e$, since, as shown in FIG. 3, the phase difference between signals A and E is 144°, while the phase difference between signal C and each of signals A and E is 72°.

Capacitors 24 and 28 derive from signal C a positive-going pulse 31 (wave $c^1$) at each positive-going edge of the wave and a negative-going pulses 32 at each negative-going edge. Pulses 32 are blocked by diode 22 or diode 26, as the case may be. Each pulse 31 will pass the associated diode only if the other signal A or E is positive. For the forward movement it will be seen that the half-cycles of signals A and E that are present on the appearance of a pulse 31, that of signal A is positive and that of signal E negative. Each pulse 31 therefore passes through diode 22 and, after being reconstituted by generator 23 to a form more suitable for the counter, is passed to the counter over the Add channel 16. On the other hand the pulses 31 are blocked by diode 26 from reaching the subtract channel because the contemporaneous half-cycles of signal E are negative.

When the table is moving in the reverse direction the wave relationships are shown in FIG. 4. Signals A and E are again in approximate counterphase with one another, but this time the pulses 31 occur during a negative half-cycle of wave A; owing to the approximate counterphase relationship between signals A and E, therefore, each of these pulses falls within a positive half-cycle of signal E. Hence this time the pulses are blocked by diode 22 but passed by diode 26 to the Subtract channel 17.

Pulses from signals other than C are derived in nine further groups on the same principle. Thus where for example the pulses are derived from signal B, the associated signals may be D and J, since these last two signals are nearly in counterphase with one another and the edges of signal B fall clearly within their half cycles. The required relationship need not of course be exactly as described, as long as the derived pulses fall sufficiently within the half-cycles of the other two signals, and not too near their edges, to ensure a good gating action.

Diodes D are provided where each phase-splitting stage is of the multivibrator kind with a driving transistor the base-emitter portion of which would act as a catching diode to prevent the negative excursions of the input signal in the absence of a diode D. An advantage of using phase-splitting stages, rather than deriving all ten signals from the resistance chain, is that the output of each stage is in the squarewave form desirable for the signal-conversion stages. Otherwise the latter stages would require squarer stages to supply their inputs.

The arrangement shown in FIG. 5 may be adopted if it is desired to make continuous parity check which supplies a warning signal whenever the counter 15 falls out of step with the pattern to the extent of a pulse. To effect this, each of the ten phase signals A to J is applied to another gating network similar to those of FIG. 2. Thus, signal A is applied by way of a capacitor 41 and diode 42 to a common lead 43 which is connected to the trigger input of a bistable trigger stage 44, the stable conditions of which may for convenience be designated P and Q. The bias for the diode is applied by way of a resistor 45. Each of the other signals B to J is connected to stage 44 by way of a similar gating network and lead 43, but only the connections for signal B are shown.

Corresponding arrangements are made for the lowest decade of the counter. Thus the digit 0 output lead is connected by way of a biased gating network 46 to a common lead 47 leading to the trigger input of another bistable trigger stage 48, the stable conditions of which may be designated R and S. Similar arrangements are made for the remaining digits.

The output points of stages 44 and 48 that are in the more positive sense when the stages are in their P and S conditions respectively are connected as inputs to an And gate 51. The output points Q and R are similarly connected to another And gate 52. The outputs from these gates are connected by way of an Or gate 53 to a lead 54 connected to some alarm device, which is not shown.

In operation, stage 44 is triggered from one to the other of its bistable conditions in synchronism with each pulse derived from the squaring stages S1 to S5 for application to the counter, and stage 48 is triggered from one to the other of its bistable conditions in synchronism with each pulse as recorded by the counter. So long as the counter is in step with the signals derived from the pattern, the outputs from the bistable stages 44 and 48 are in step with one another to the extent that the outputs P and R are always of like sense; thus P and S are of opposite sense, so that there is no output from gate 51;

similarly Q and R are of opposite sense and there is no output from gate 52. As soon as the counter falls out of step by one pulse, however, stages 44 and 48 fall out of step with one another, with the result that outputs P and S are of the same sense at the same time, and outputs Q and R are also alike. Each of gates 51 and 52 in turn passes a signal through gate 53 to lead 54 to give warning of the fault.

It is not necessary to use a closed chain of resistors: an open chain may be used, provided that it is energised by the input signal effectively in cyclic order. Thus where the input signal is of $n$ phases, the open chain may be comprised by an $n$ equal resistors in series. Of the $n+1$ taps thus provided, the first $n$ are energised by the $n$ phases respectively in cyclic order, and the $(n+1)$th tap by the same phase as energises the first tap at the other end of the chain. The output signals are derived from taps spread along the whole, or only part of, the chain, depending on whether phase-splitting stages are provided, in accordance with the tangent law above described.

In certain circumstances, where phase-splitting stages are provided, it is practicable to discontinue the chain beyond the necessary output taps. Thus in the arrangement of FIG. 1, the unused part of the chain from tap T3 past tap T4 to tap T1 may be discarded. The cell P4 thus becomes disconnected, but its presence is nevertheless desirable to assist in adjusting the apparatus and for test purposes.

The utilisation means may alternatively take the form shown in FIG. 6. Bistable stages BS1 to BS5 correspond to phase-splitter stages S1 to S5. In this embodiment it is more convenient to designate their output terminals as A and B for stage BS1, C and D for stage BS2, and so on. These terminals are connected to the inputs of signal-conversion stages in the form of ten two-entry And gates 60 to 69. Terminals B and C are connected to the inputs of gate 60, D and E to gate 61, and so on, terminals J and B being connected to gate 64 and terminals I and A to gate 69. To the outputs of these gates are connected ten primary lines P0 to P9 respectively.

As will be described below with reference to FIGS. 7(a), 7(b) and 7(c), the movement of the worktable 10 (FIG. 1) causes these lines to be energised sequentially and cyclically by pulses, in what may be called a primary train, to represent the ten decimal digits. When the table moves in a forward direction the lines are energised by the pulses in the cyclic order P0, P1, P2, P3 . . . P9, P0, P1, and so on, whereas when the table moves in the reverse direction the lines are energised in the order P0, P9, P8 . . . and so on.

These primary lines are connected as one of the two input channels to a comparator 71. The other input channel is formed by ten secondary lines S0 to S9 which are arranged to be pulse-energised by a secondary train of pulses, which also represent the ten decimal digits, under the control of a single-stage bidirectional switching counter 72 operating in the decimal scale. Each of the lines P0 to P9 is associated with the particular one of the lines S0 to S9 which represents the same decimal digit— line P0 with line S0, both of which represent the digit 0, and so on.

The comparator is arranged to compare the respective states of energisation of the primary and secondary lines to check whether the two trains are in step with one another—by which is meant that the respective lines which are energised at the same time are associated lines, and hence that the digit value registered by the lines P0 to P9 is the same as that registered by the lines S0 to S9. Whenever the trains are out of step, the comparator supplies over a lead 73 an error signal to a servo stage 74. By means of an Add gate 75 and a Subtract gate 76, this stage controls the application of pulses from a local source 77 over Add and Subtract connections 78 to the switching counter 72 in such a manner that when the train that has fallen behind is the secondary train, the pulses from source 77 are passed to the counter by way of Add gate 75 to be added; but when it is the primary train that is lagging, the pulses are passed by way of a gate 76 to be subtracted. Hence the servo operates so as to tend to keep the two trains in step. The pulses as supplied to the switching counter are also suplied to a multi-stage bidirectional counter 79.

Suitable arrangements for comparator 71 and the associated servo system may be as described in our co-pending United States patent application No. 453,945, filed in the name of George Sanderson Walker and Ronald Robert McLaren, on May 7, 1965, and assigned to the assignee of the present invention and corresponding to British patent application No. 19255/64.

The operation of this equipment will be briefly indicated with reference to FIGS. 7(a), 7(b) and 7(c). FIG. 7(a) shows the waveforms of the signals at the respective output terminals A to I of bistable stages BS1 to BS5. Signals A, C, E, G, and I, being from like output points of the stages, are at 36° spacings; the remaining signals are in counterphase with them respectively.

At FIG. 7(b) are shown the waveforms of the signals passed by gates 60 to 69 as the result of combining the signals of FIG. 7(a)—B with C, D with E, and so on, as indicated. The gates are assumed to conduct when both inputs are in the more-positive condition. The resulting signals form the primary train of pulses on lines P0 to P9.

Whilst the table causes the pattern to move over the range 0° to 36°, line P0 is energised. Further movement of the pattern in the same direction causes line P1 to be energised instead of line P0. Thus a movement of the pattern throughout one cycle in one direction causes each of the lines to be energised in turn. Movement in the reverse direction causes the lines to be energised in the reverse cyclic order, as already explained.

The secondary lines are energised by counter 72 in a similar manner. Thus, whilst the counter holds digit 0, line S0 is energised; when a pulse is added so that the counter holds digit 1, line S1 is energised instead of S0, and so on.

The comparator and servo operate to maintain the two trains in step. By adding algebraically the pulses supplied to the switching counter 72, the main counter represents by the total it holds at any given moment the extent of the movement of the worktable in a given direction from a datum point. Thus counter 79 operates to provide the required measurement in a similar manner to counter 15 of the embodiment first described and to a similar extent of resolution.

It is necessary for the operation of the comparator that there should be no appreciable intervals of time between the successive pulses of the primary train. If the action of stages BS1 to BS5 or the ensuing gates is such that gaps tend to occur, they may be prevented by deriving the primary pulses so that successive ones overlap in time. This may be effected very simply by modifying the connections from stages BS1 to BS5 to the gates, as shown in FIG. 8, so that signal B is combined with signal E rather than with signal C, the other combinations being DG, FI, HB, and so on. The resulting pulses on lines P0 to P1 are shown in FIG. 7(c). The degree of overlap should not be so extensive as to cause more than two of the primary lines to be energised at one time.

It should be appreciated that the references in this specification and claims to the pulses in and the pulse-energisation of the primary and secondary lines should be understood in a broad sense. In the normal operation of the apparatus of FIG. 6 the lines are energised in sequence in dependence on the pattern movement, with the result that the "width" of each such pulse in any one line indicates the length of time for which it is energised. This in turn is proportional to the speed of the movement. Thus whenever the pattern is stationary, and accordingly the particular primary and secondary lines which represent its then position are energised steadily, the "pulse"

in each has a width equal to the duration of the stoppage. The term "pulse" should therefore be interpreted to include that condition of energisation.

What we claim is:

1. Apparatus for determining the extent and sense of the movement of a cyclic pattern with respect to a reference structure including $n$ pickup devices, where $n$ is at least 3, secured to said structure so as to respond electrically in dependence on the conditions of the pattern at $n$ regularly spaced angular positions along the pattern, thereby providing a symmetrical $n$-phase electrical signal when the pattern moves, a tapped resistance chain, connections for applying the $n$ phases of the signal effectively in cyclic order to taps on the chain at points which are equally spaced resistively, phase-conversion arrangements connected to the chain to provide in response to the $n$-phase energisation of the chain a symmetrical N-phase signal consisting of N signals uniformly displaced in phase by $360°/N$, where N is at least twice $n$, signal-squaring stages connected to the phase-conversion arrangements for converting into square-wave form the signal in each phase, and utilisation means connected to the squaring stages and including a bi-directional counter for deriving the measurement of the movement in terms of a pulse count.

2. Apparatus as claimed in claim 1 wherein the phase-conversion arrangements include N taps on the chain at resistive points such that the potentials of adjacent taps differ in phase by $360/N$ electrical degrees.

3. Apparatus as claimed in claim 1 wherein the phase-conversion arrangements include $N/2$ taps on the chain at resistive points such that the potentials of adjacent taps differ in phase by $360/N$ electrical degrees, and a phase-splitting stage connected to each tap, the N-phase signal being derived from the outputs of the $N/2$ phase-splitting stages.

4. Apparatus as claimed in any one of claims 1, 2 and 3 wherein the utilisation means includes signal-conversion stages connected to the squaring stages for deriving from the squared N-phase signal a pulse from at least each cycle of each phase and directing each pulse into an Add or a Subtract channel in dependence on the direction of said movement, the Add and the Subtract input points of said bi-directional counter being connected to those channels.

5. Apparatus as claimed in any one of claims 1, 2 and 3 wherein the utilisation means includes signal-conversion stages connected to the squaring stages for deriving from the squared N-phase signal a pulse from at least each cycle of each phase and directing each pulse into an Add or Subtract channel in dependence on the direction of said movement, the Add and the Subtract input points of said bi-directional counter being connected to those channels and the signal-conversion stages include for each squared phase signal connections for deriving from one of the other squared phase signals not in counterphase with it a pulse in synchronism with an edge of that other signal, and gating means for applying that pulse to one or other of said channels in dependence on whether the pulse occurs during a positive-going or negative-going half-cycle of the first-mentioned squared signal.

6. Apparatus as claimed in any one of claims 1, 2 and 3 wherein the utilisation means includes signal-conversion stages connected to the squaring stages for deriving from the squared N-phase signal a pulse from at least each cycle of each phase and directing each pulse into an Add or a Subtract channel in dependence on the direction of said movement, the Add and the Subtract input points of said bi-directional counter being connected to those channels and for supplying a continuous parity check there are provided two bistable trigger stages, connections from the squaring stages to one of those bistable stages to trigger it in synchronism with each said pulse, connections to the other bistable stage from the lowest decade of the counter to trigger that stage in synchronism with each pulse as recorded by the counter, and a gating network connected to the two outputs of each bistable stage to provide a warning response whenever the output signal from one bistable stage falls out of step with the output signal from the other stage to the extent of one pulse as the result of the counter falling out of step with the pattern to that extent.

7. Apparatus as claimed in any one of claims 1, 2 or 3 wherein the utilisation means includes signal conversion stages connected to the squaring stages for pulse energising N primary lines sequentially and cyclically in the order N1, N2 . . . N$n$ or in the reverse order in dependence on the sense of the movement of the cyclic pattern with respect to the reference structure with no appreciable time intervals between successive pulses, thereby providing a primary train of pulses delivered by N primary lines, N secondary lines associated with the N primary lines respectively, a bi-directional switching counter for sequentially energising the secondary lines by a secondary train of pulses, a comparator connected to the primary and secondary lines for providing an error signal whenever the trains fall out of step with one another—that is to say, whenever the trains cease to energise associated lines at the same time—to a predetermined sense, servo means connected to the comparator to receive the error signal, a source of local pulses, Add and Subtract connections from that source to the counter by way of gating stages, and connections from the servo means to those gating stages to control the application of the local pulses to the counter to be added or subtracted so as to tend to keep the trains in step, said first-mentioned counter being connected to the Add and Subtract connections to count algebraically the local pulses as supplied to the switching counter.

8. Apparatus as claimed in claim 7 wherein the signal-conversion stages include arrangements for And-gating appropriate pairs of the squared phase signals.

9. Apparatus as claimed in claim 8 wherein the And-gating arrangements include N And gates the outputs of which are connected to the N primary lines and the two inputs to each of which are connected to two squared phase signals which overlap to provide the required energisation of the primary line concerned.

References Cited

UNITED STATES PATENTS

| 3,142,121 | 7/1964 | Stefanov. | |
| 3,234,361 | 2/1966 | McLaren et al. | 235—92 |
| 3,310,798 | 3/1967 | Wingate | 340—347 |

MAYNARD R. WILBUR, *Primary Examiner.*

M. K. WOLENSKY, *Assistant Examiner.*

U.S. Cl. X.R.

235—92

UNITED STATES PATENT OFFICE
CERTIFICATE OF CORRECTION

Patent No. 3,449,743      Dated June 10, 1969

Inventor(s) Alexander Turnbull Shepherd et al.

It is certified that error appears in the above-identified patent and that said Letters Patent are hereby corrected as shown below:

Column 1, line 51, after "chain" insert --a--. Column 2, line 32, after "S1" insert --to S5--. Column 3, line 13, "2T" should read --T2--; line 69, "pulses" should read --pulse--; line 73, after "that" insert --of--. Column 4, line 9, after "are" insert --as--. Column 6, line 60, "P1" should read --P9--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents